United States Patent

Hahn et al.

[11] Patent Number: 5,470,502
[45] Date of Patent: Nov. 28, 1995

[54] FLUORESCENT PIGMENTS

[75] Inventors: Erwin Hahn, Heidelberg; Werner Ostertag, Gruenstadt; Guenther Seybold, Neuhofen, all of Germany

[73] Assignee: BASF Aktiengesellschaft, Ludwigshafen, Germany

[21] Appl. No.: 193,874

[22] Filed: Feb. 8, 1994

Related U.S. Application Data

[63] Continuation of Ser. No. 999,733, Oct. 23, 1992, abandoned, which is a continuation of Ser. No. 845,799, Mar. 9, 1992, abandoned, which is a continuation of Ser. No. 595,853, Oct. 11, 1990, abandoned.

[30] Foreign Application Priority Data

Oct. 11, 1989 [DE] Germany ............ 39 33 903.3

[51] Int. Cl.$^6$ ............................ C09K 11/02
[52] U.S. Cl. .................. 252/301.35; 252/301.26
[58] Field of Search ............ 252/301.35, 301.26

[56] References Cited

U.S. PATENT DOCUMENTS

| | | |
|---|---|---|
| 2,498,592 | 2/1950 | Switzer et al. |
| 2,938,873 | 5/1960 | Kazenas. |
| 3,880,869 | 4/1975 | Scheuermann et al. |
| 3,915,884 | 10/1975 | Kazenas ............ 252/301.35 |
| 4,186,020 | 1/1980 | Wachtel ............ 106/22 |
| 4,379,934 | 4/1983 | Graser et al. ............ 252/301.25 |
| 4,407,882 | 10/1983 | Hauser et al. ............ 428/159 |
| 4,446,324 | 5/1984 | Graser ............ 546/37 |
| 4,484,952 | 11/1984 | Bes et al. ............ 106/499 |
| 4,492,648 | 1/1985 | Claussen ............ 252/582 |
| 4,618,694 | 10/1986 | Iden et al. ............ 252/301.35 |
| 4,845,223 | 7/1989 | Seybold et al. ............ 546/37 |
| 4,865,937 | 9/1989 | Santilli et al. ............ 430/137 |
| 5,236,621 | 8/1993 | DiPietro ............ 252/301.35 |

FOREIGN PATENT DOCUMENTS

| | | |
|---|---|---|
| 1212021 | 9/1986 | Canada. |
| 0073007 | 3/1983 | European Pat. Off.. |
| 0077496 | 4/1983 | European Pat. Off.. |
| 0118667 | 9/1984 | European Pat. Off.. |
| 0227980 | 7/1987 | European Pat. Off.. |
| 2289574 | 10/1975 | France. |
| 2514377 | 10/1982 | France. |
| 2009749 | 9/1971 | Germany. |
| 2451782 | 5/1976 | Germany. |
| 2546118 | 4/1977 | Germany. |
| 37-15788 | 10/1962 | Japan. |
| 64-85308 | 3/1989 | Japan. |
| 1523475 | 8/1978 | United Kingdom. |
| 2108544 | 5/1983 | United Kingdom. |

OTHER PUBLICATIONS

Larsen, *Industrial Printing Inks,* Reinhold Publishing Corp., N.Y., pp. 1, 33 and 47–48 (1962). (Month Unknown).
Abstract, vol. 13, No. 290 (C–614) ]3638] Jul. 5, 1989, From Patent Abstracts of Japan.

*Primary Examiner*—Prince Willis, Jr.
*Assistant Examiner*—Alan D. Diamond
*Attorney, Agent, or Firm*—Oblon, Spivak, McClelland, Maier & Neustadt

[57] ABSTRACT

Fluorescent pigments have a mean particle size of from 8 to 16 lm and contain apolar polymer matrices based on polymethyl methacrylate, polystyrene, polybutadiene-modified polystyrene, polycarbonate, polyvinyl chloride or polyamide and one or more apolar fluorescent dyes of the coumarin or perylene series.

3 Claims, No Drawings

FLUORESCENT PIGMENTS

This application is a continuation of application Ser. No. 07/999,733, filed on Oct. 23, 1992, now abandoned which is a continuation of Ser. No. 07/845,799, filed Mar. 9, 1992, now abandoned, which is a continuation of Ser. No. 07/595,853, filed Oct. 11, 1990, now abandoned.

The present invention relates to novel fluorescent pigments whose mean particle size is from 8 to 16 mm, which are based on apolar polymer matrices selected from the group consisting of polymethyl methacrylate, polystyrene, polybutadiene-modified polystyrene, polycarbonate, polyvinyl chloride and polyamide and which contain one or more apolar fluorescent dyes of the coumarin or perylene series.

U.S. Pat. No. 2,498,592 and U.S. Pat. No. 3,915,884 disclose fluorescent pigments which are based on dyes of the naphthalimide series and whose polymer matrices are polycondensates based on urea and formaldehyde or of polyamide.

Furthermore, U.S. Pat. No. 2,938,873 describes fluorescent pigments whose dyes are of the naphthalimide or coumarin series and whose polymer matrices contain resins based on p-toluenesulfonamide and formaldehyde.

However, it has been found that such fluorescent pigments have inadequate application properties, in particular an inadequate lightfastness.

It is an object of the present invention to provide novel fluorescent pigments which are free of the abovementioned disadvantages.

We have found that this object is achieved by the fluorescent pigments defined at the beginning.

The novel fluorescent pigments contain one or more apolar fluorescent dyes of the coumarin or perylene series.

Suitable apolar coumarin dyes are for example those described in U.S. Pat. No. 3,880,869, notably coumarin dyes of the formula III

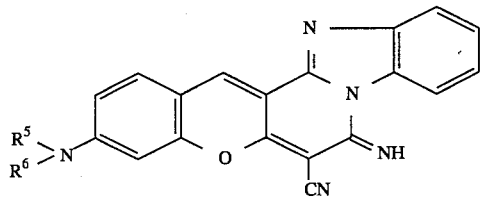

where $R^5$ and $R^6$ are identical or different and each is independently of the other $C_1$–$C_4$-alkyl, in particular ethyl.

Other especially notable fluorescent pigments contain coumarin dyes of the formula IV

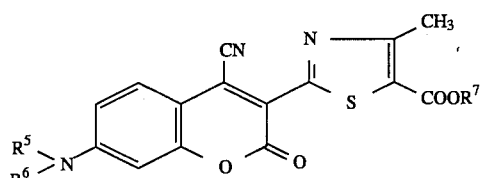

where $R^5$ and $R^6$ are identical or different and each is independently of the other $C_1$–$C_4$-alkyl, in particular ethyl, and Ris $C_1$–$C_{11}$-alkyl.

Suitable apolar perylene dyes are for example those described in U.S. Pat. No. 4,618,694, DE-A-2,451,782, U.S. Pat. No. 4,379,934, U.S. Pat. No. 4,446,324 and EP-A-227,980.

Further suitable apolar perylene dyes are for example those described in EP-A-73,007.

Preference is given to fluorescent pigments which contain dyes of the perylene series.

Emphasis must be given to fluorescent pigments which contain perylene dyes of the formula V

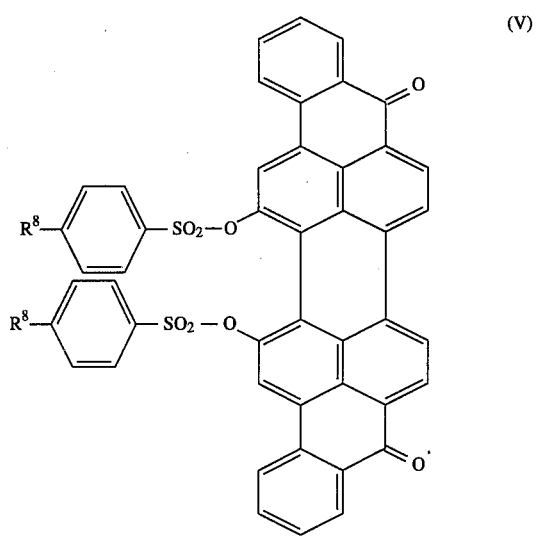

where $R^8$ is $C_1$–$C_{13}$-alkyl.

Particular preference is given to fluorescent pigments which contain perylene dyes of the formula I

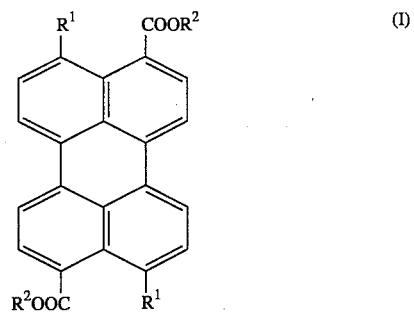

where $R^1$ is hydrogen or cyano and $R^2$ is $C_1$–$C_{11}$-alkyl.

Particular preference is further given to fluorescent pigments which contain perylene dyes of the formula II

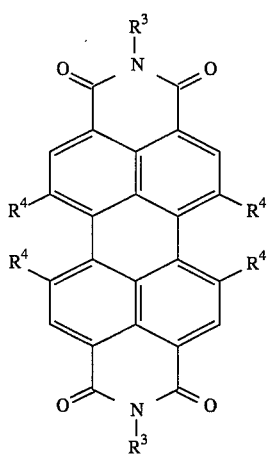

(II)

where

R³ is C₅–C₂₀-alkyl which may be interrupted by an oxygen atom or is phenyl which is monosubstituted or polysubstituted by C₁–C₁₃-alkyl or C₁–C₁₃-alkoxy, and R⁴ is hydrogen, chlorine, phenoxy or halogen-, C₁–C₄-alkyl- or C₁–C₄-alkoxy-substituted phenoxy.

Preference is given in particular to fluorescent pigments which contain dyes of the formula II where R³ is C₁–C₄-alkyl- or C₁–C₄-alkoxy-monosubstituted or -polysubstituted phenyl and R⁴ is hydrogen, phenoxy or chlorine.

Very particular emphasis must be given to fluorescent pigments which contain a dye of the formula I where each R¹ is cyano and each R² is butyl.

Very particular emphasis must further be given to fluorescent pigments which contain a dye of the formula II where R³ is 2,6-diisopropylphenyl and R⁴ is phenoxy.

Suitable R², R⁵, R⁶, R⁷ and R⁸ are for example methyl, ethyl, propyl, isopropyl, butyl, isobutyl and sec-butyl.

R², R⁷ and R⁸ may also be for example, like R³, pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl or undecyl.

R³ and R⁸ may each also be for example dodecyl, tridecyl or isotridecyl.

R³ may also be for example tetradecyl, pentadecyl, hexadecyl, heptadecyl, octadecyl, nonadecyl or eicosyl (The above names isooctyl, isononyl, isodecyl and isotridecyl are trivial names derived from the oxo process alcohols—cf. Ullmann's Encyklopädie der technischen Chemie, 4th edition, Volume 7, pages 215 to 217, and Volume 11, pages 435 and 436.), 2-propoxyethyl, 2-isopropoxyethyl, 2-butoxyethyl, 2- or 3-methoxypropyl, 2-or 3-ethoxypropyl, 2- or 3-propoxypropyl, 2- or 3-isopropoxypropyl, 2- or 3-butoxypropyl, 2- or 3-(2-ethylhexyloxy)propyl, 2- or 4-methoxybutyl, 2- or 4-ethoxybutyl, 2- or 4-propoxybutyl, 2- or 4-isopropoxybutyl, 2-or 4-butoxybutyl, 2- or 4-(2-ethylhexyloxy)butyl, 2-methyl-6-isopropylphenyl, 2-methyl-6-sec-butylphenyl, 2-methyl-6-tert-butylphenyl, 2-ethyl-6-isopropylphenyl, 2-ethyl-6-sec-butylphenyl, 2-ethyl-6-tert-butylphenyl, 2-methylphenyl, 2,3-, 2,4-, 2,5- or 2,6-dimethylphenyl, 2,4,6-trimethylphenyl, 2-methyl-4-methoxyphenyl, 2,5-dimethyl-4-methoxyphenyl, 2-ethylphenyl, 2,6-diethylphenyl, 2,6-diethyl-4-methylphenyl, 2-isopropylphenyl, 2,4-, 2,5- or 2,6-diisopropylphenyl, 2-n-butylphenyl, 2-sec-butylphenyl, 2-n-pentylphenyl, 2-n-hexylphenyl, 2-(2-methylpentyl)phenyl, 2-n-octylphenyl, 2-methoxyphenyl, 2-ethoxyphenyl, 2,5-dimethoxyphenyl, 2,5-diethoxyphenyl, 2,4-dimethoxyphenyl, 2,4-diethoxyphenyl, 2,3-dimethoxyphenyl or 2,3-diethoxyphenyl.

R⁴ may also be for example 2-, 3- or 4-fluorophenoxy, 2-, 3- or 4-chlorophenoxy, 2-, 3- or 4-bromophenoxy, 2-, 3- or 4-tert-butylphenoxy, 2-isopropyl-4-methylphenoxy, 2,3-, 2,4-, 2,5- or 2,6-dichlorophenoxy, 2,4,5- or 2,4,6-trichlorophenoxy, 2-, 3- or 4-methylphenoxy, 2,3-, 2,4-, 2,5-, 2,6- or 3,5-dimethylphenoxy, 2,5,6-trimethylphenoxy, 2-methyl-4-chlorophenoxy, 2-methyl-5-chlorophenoxy, 2-methyl-6-chlorophenoxy, 2-ethylphenoxy, 2,6-diethylphenoxy, 2,6-diethyl-4-methylphenoxy, 2-isopropylphenoxy, 3-methyl-4-chlorophenoxy, 4-propylphenoxy, 4-butylphenoxy, 2-, 3- or 4-methoxyphenoxy, 2-, 3- or 4-ethoxyphenoxy, 2-, 3- or 4-propoxyphenoxy, 2-, 3- or 4-isopropoxyphenoxy, 2-, 3- or 4-butoxyphenoxy or 2,4-dimethoxyphenoxy.

The fluorescent pigments according to the present invention are based on apolar polymer matrices selected from the group consisting of polymethyl methacrylate, polystyrene, polybutadiene-modified polystyrene, polycarbonate, polyvinyl chloride and polyamide.

Preference is given under this condition to those fluorescent pigments having polymer matrices made of polymethyl methacrylate or polystyrene.

The polymer matrices mentioned are known per se and are commercially available.

The fluorescent dye content of the fluorescent pigments according to the present invention is in general from 1 to 3% by weight, based on the polymer matrix.

The fluorescent dyes mentioned can be present in the novel fluorescent pigments either each on its own or else mixed with others. Similarly, the fluorescent pigments according to the present invention may contain only one of the polymer matrices mentioned or else mutual mixtures thereof.

The novel fluorescent pigments are advantageously prepared by first incorporating the fluorescent dye into the polymer matrix, which is customarily in the form of granules, in a conventional manner, for example by extrusion or injection molding. If extrusion is chosen, the use of a twin-screw extruder will be found particularly advantageous. The process of incorporation generally takes place at 150°–250° C., preferably—if polymethyl methacrylate is used as polymer matrix—at 200°–240° C.

The colored plastics material resulting from the incorporation is then strand granulated, the resulting particles generally ranging in size from 2 to 6 mm. These granules are then further comminuted, which is advantageously carried out in a conventional pin mill. Following this precomminution the granules usually have a size ranging from 0.8 to 1.2 mm.

Since the fluorescent pigments according to the present invention are to have a mean particle size ranging from 8 to 16 μm, preferably from 10 to 12 μm, further comminution is necessary, which is advantageously carried out in a jet mill. It is particularly advantageous here to use a fluidized bed counterjet mill, for example a counterjet mill of the type GK-W 481 from Alpine.

The novel fluorescent pigments are highly suitable for pigmenting waterborne paints and films and articles made of polyolefins, eg. polyethylene or polypropylene, and for printing fiber materials, for example fabrics in polyester or cotton or polyester/cotton blend fabrics.

The novel fluorescent pigments possess high luminance and advantageous application properties, for example a high lightfastness and a low migration tendency.

The Examples which follow illustrate the invention. PMMA denotes polymethyl methacrylate.

EXAMPLE 1

10 g of 3,9-bis(isobutoxycarbonyl)-4,10-dicyanoperylene were incorporated into 1 kg of PMMA granules in a conventional manner by extrusion from a twin-screw extruder at 210° C., and the extruded material was granulated. This product, which had a particle size of 4 mm in the longest dimension, was precomminuted in a pin mill. After precomminution the granules had a mean particle size of 1 mm.

The precomminuted granules were introduced into a fluidized bed counterjet mill (counterjet mill of type GK-W 481 from Alpine) having a horizontally disposed sifting wheel. The operating conditions for the apparatus, which is operated with gaseous nitrogen, were:

sifting wheel: 6700 r.p.m.
gas pressure at jets: 4 bar
air pressure at shaft: 0.45 bar
air pressure at motor: 0.5 bar The product was a luminous bright yellow color. Cilas granulometry revealed a mean particle size of 11.7 μm (volume distribution).

EXAMPLE 2

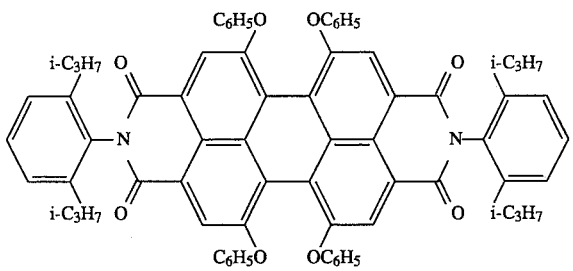

were incorporated into PMMA at 210° C. and the resulting material was ground into a luminous red pigment powder having a mean particle size of 10 μm, both steps being carried out as described in Example 1.

The fluorescent dyes listed in the table below were processed into fluorescent pigments as described in Example 1.

| Example No. | Dye | Polymer matrix | Concentration of dye [% by weight] | Color |
|---|---|---|---|---|
| 3 | (C₂H₅)₂N-...-O-...-N=...-N(C₆H₅)...=NH, CN | PMMA | 2 | bluish red |
| 4 | (C₂H₅)₂N-...-O-...-N=...-N(C₆H₅)...=NH, CN | polystyrene | 2 | bluish red |
| 5 | (C₂H₅)₂N-...-O-...-N=...-S-C(CH₃)=...-COOC₉H₁₉ | PMMA | 2 | yellowish red |
| 6 | (C₂H₅)₂N-...-O-...-N=...-S-C(CH₃)=...-COOC₉H₁₉ | polystyrene | 2 | yellowish red |

-continued

| Example No. | Dye | Polymer matrix | Concentration of dye [% by weight] | Color |
|---|---|---|---|---|
| 7 | (perylene bisimide with 2,6-di-isopropylphenyl groups and 4 Cl substituents) | PMMA | 2 | reddish orange |
| 8 | (perylene bisimide with 2,6-di-isopropylphenyl groups and 4 Cl substituents) | polyvinyl chloride | 2 | reddish orange |
| 9 | (perylene bisimide with 2,6-di-isopropylphenyl groups) | polystyrene | 2 | orange |
| 10 | (perylene bisimide with 2,6-di-isopropylphenyl groups) | PMMA | 2 | orange |
| 11 | (perylene bisimide with $C_2H_5O-C_3H_6-$ N substituents) | PMMA | 3 | orange |
| 12 | (perylene bisimide with 2,4,6-trimethylphenyl groups) | PMMA | 2 | orange |

-continued

| Example No. | Dye | Polymer matrix | Concentration of dye [% by weight] | Color |
|---|---|---|---|---|
| 13 | 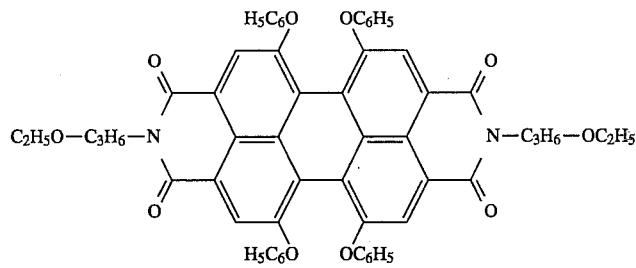 | PMMA | 2 | luminous red |
| 14 | 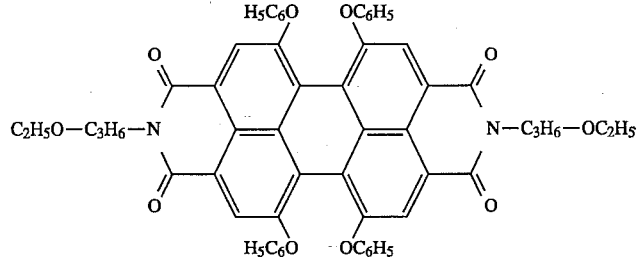 | polystyrene | 2 | luminous red |
| 15 | 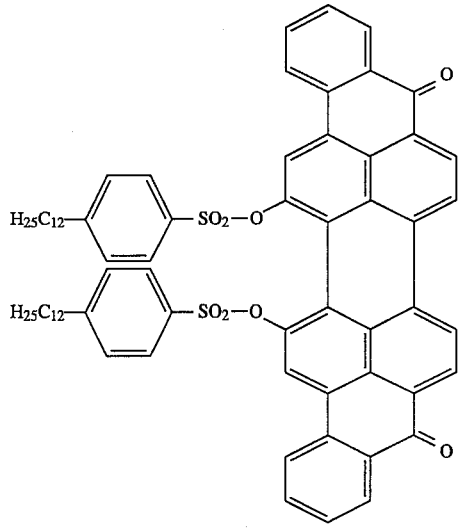 | PMMA | 3 | deep red |

EXAMPLE 16

(Application)

40 g of the fluorescent pigment prepared as described in Example 2 were incorporated into a dispersion containing 760 ml of water, 30 g of polyacrylic acid, 30 g of an emulsifier based on a formaldehyde condensation product and 180 g of a binder based on polybutadiene by intensive stirring. The resulting homogeneous suspension was printed onto polyester/cotton blend fabric and fixed thereon at 115° C. for 4 minutes. This produced a luminous red print having particularly good wash fastness properties and an excellent lightfastness (4–5 on the blue scale).

EXAMPLE 17

(Application)

5 g of a fluorescent pigment prepared as described in Example 2 were intensively mixed with 95 g of polyethylene granules, the mixture was extruded, and the extrudates were granulated.

These granules were used on a blow molding machine to produce a 50 μm thick polyethylene sheet which exhibited fluorescence at 613 nm.

The sheet was suitable for promoting the growth of green plants. It was notable for good lightfastness and low dye migration.

We claim:

1. A fluorescent pigment having a mean particle size of from 8 to 16 μm, said fluorescent pigment comprising
    an apolar polymer matrix selected from the group consisting of polymethylmethacrylate, polystyrene, polybutadiene-modified polystyrene, polycarbonate, polyvinylchloride and polyamide,
    and one or more apolar fluorescent perylene dyes of the formula I

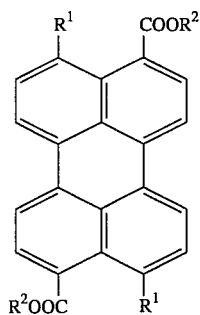

where
  $R^1$ is hydrogen or cyano and
  $R^2$ is $C_1$–$C_{11}$-alkyl
or of the formula II

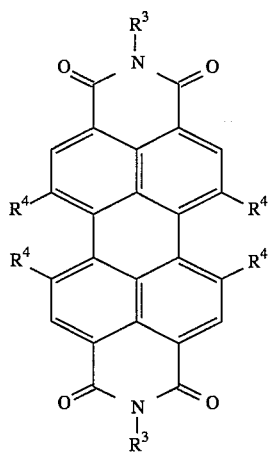

where
  $R^3$ is a $C_5$–$C_{20}$ alkyl or is phenyl which is monosubstituted or polysubstituted by $C_1$–$C_{13}$-alkyl or $C_1$–$C_{13}$-alkoxy, and
  $R^4$ is hydrogen, chlorine, phenoxy or halogen-, $C_1$–$C_4$-alkyl- or $C_1$–$C_4$-alkoxy-substituted phenoxy
said fluorescent dyes being present in said pigment in an amount of from 1 to 38% by weight, based on said polymer matrix.

2. A flourescent pigment as claimed in claim 1, which contains a dye of the formula I

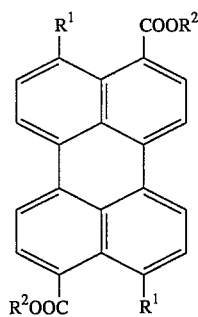

where
  $R^1$ is hydrogen or cyano and
  $R^2$ is $C_1$–$C_{11}$-alkyl.

3. A fluorescent pigment as claimed in claim 1, which contains a dye of the formula II

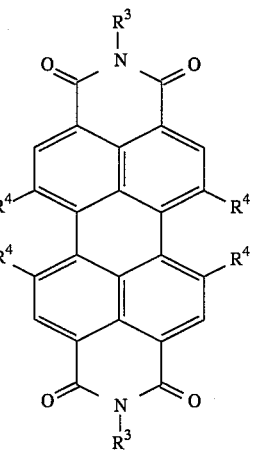

where
  $R^3$ is $C_5$–$C_{20}$-alkyl or is phenyl which is monosubstituted or polysubstituted by $C_1$–$C_{13}$-alkyl or $C_1$–$C_{13}$-alkoxy, and
  $R^4$ is hydrogen, chlorine, phenoxy or halogen-, $C_1$–$C_4$-alkyl- or $C_1$–$C_4$-alkoxy substituted phenoxy.

* * * * *